United States Patent [19]

Ziegler

[11] Patent Number: 5,147,677
[45] Date of Patent: Sep. 15, 1992

[54] PROCESS FOR PRODUCING MICROPARTICULATED PROTEIN AND THE PRODUCT THEREOF

[75] Inventor: Gregory R. Ziegler, State College, Pa.

[73] Assignee: The Pennsylvania Research Corporation, University Park, Pa.

[21] Appl. No.: 570,582

[22] Filed: Aug. 21, 1990

[51] Int. Cl.⁵ .................. A23L 1/32; A23L 1/307
[52] U.S. Cl. ..................... 426/614; 426/804; 426/657; 426/96; 426/99
[58] Field of Search ............... 426/576, 614, 656, 804, 426/96, 99, 657

[56] References Cited

U.S. PATENT DOCUMENTS

| | | | |
|---|---|---|---|
| 2,738,275 | 3/1956 | Block | 426/96 |
| 3,364,036 | 1/1968 | Tesko et al. | 426/96 |
| 3,607,306 | 9/1971 | McMichael | 426/96 |
| 4,194,013 | 3/1980 | Rehacek et al. | 426/96 |
| 4,855,156 | 8/1989 | Singer et al. | 426/565 |

OTHER PUBLICATIONS

G. R. Ziegler, Biotechnol. Prog., vol. 7, pp. 283-287 (1991), "Microstructure of Mixed Gelatin-Egg White Gels: Impact on Rheology and Application of Microparticulation".

G. R. Ziegler et al., J. Food Sci., 54(2); pp. 430-436; 1989 Institute of Food Technologists, "Predicting the Dynamic Ealstic Modulus of Mixed Gelatin-Egg White Gels".

Primary Examiner—Jeanette Hunter
Attorney, Agent, or Firm—Thomas J. Monahan

[57] ABSTRACT

The present invention is directed to a process for the manufacture of microparticulated protein from egg white and gelatin protein phases, the product manufactured therefrom, and to the use of the product manufactured in accordance with the process as a replacement of at least a portion of fat in formulated edible foods manufactured for human use.

12 Claims, 5 Drawing Sheets

PROCESS FOR PRODUCING MICROPARTICULATED PROTEIN AND THE PRODUCT THEREOF

There is a growing consumer demand for high quality foods which are low in fat. Given the commercial success of artificial sweeteners, many companies are now in pursuit of fat substitutes and among such potential fat substitutes is a group derived from proteins. Suspensions of hydrated protein beads so small that the tongue cannot perceive them individually have been found to simulate the smooth, creamy, emulsion-like organoleptic character of fat.

Increasing health consciousness among consumers has spawned an increased demand for "healthy" foods. Among those suggesting that food processors assume the responsibility for providing such foods in the U.S. Surgeon General's 1988 Report on Nutrition and Health which recommends specific reductions in total fat, saturated fat and cholesterol due to increasing evidence suggesting a role of these dietary factors in coronary heart disease.

Despite health concerns, recent trends suggest that consumers are also demanding higher quality foods. For instance, though the total sales of ice cream products has remained relatively stable for the past ten years, the proportion of premium and super premium ice creams which are higher in fat has increased from 35% of sales in 1987 to 40% of sales in 1989. Considering the demand for lower fat, higher quality products, and with the success of artificial sweeteners, the food, chemical and pharmaceutical industries are actively pursuing the development of fat substitutes.

Among the potential substitutes of fat in food products derived from proteins are those listed in the following table of protein-based fat substitutes:

| SUBSTITUTE | MANUFACTURER | DESCRIPTION |
| --- | --- | --- |
| Simplesse ® | The NutraSweet Co. | Microparticulated protein (egg white or milk) |
| Modified texturized fat substitute | Kraft General Foods | Serum milk protein/xanthan gum complex |
| NutriFat PC ® | Reach Associates | Blend of proteins and polysaccharides |
| Instant NutriFat PC ® | Reach Associates | (as above but does not require heating) |
| FINESSE ® | Reach Associates | Biezo (Squeezed) protein |

The most notable of the protein-based fat substitutes is Simplesse ®, a product manufactured from egg white or milk proteins, vegetable gum, lecithin, sugar, acid and water through a process known as microparticulation. As described in U.S. Pat. No. 4,734,287, microparticulation is a cooking and blending process which aggregates the protein into small nearly spherical particles of 0.1–3.0 μm in diameter. These protein particles are small enough that the tongue cannot perceive them individually, but rather perceives then as having the creamy rich texture of fat. Microparticulation is accomplished using the standard food processing techniques of cooking and blending. The only changes which occur to the protein are those same changes which happen when eggs and mile are cooked. The potential applications for such products include salad dressings, mayonnaise, yogurt, sour cream, margarine and cheese spreads.

Under the appropriate conditions of temperature, protein concentration, and pH, two proteins may be thermodynamically incompatible. When this implies is, that when mixed together in a solvent such as water, two separate phases will form. One phase will contain mostly one protein and its share of the solvent, while the second phase will contain mostly the second protein with its share of water also. The relative proportions of solvent associated with each protein phase is principally a function of the physical and chemical properties of the proteins. This is generally referred to as aqueous phase partitioning, and it has been used as the basis of conventional methods for protein extraction and fractionation.

Aqueous phase partitioning has been observed for mixtures of gelatin and egg white [see J. Food Sci. 54(2):430 (1989)].

The primary aspect of the present invention is to describe a process for the microparticulation of proteins for use as total or partial fat replacements or substitutes in food products. More specifically, the present invention describes an aqueous phase partitioning process of egg white proteins and gelatin which can be used as an effective means for the microparticulation of egg white protein to form microparticles. The microparticles manufactured according to the present invention measure approximately 0.1 to 3.0 μm in diameter, and are preferably within the range of approximately 1.0 to 2.0 μm in diameter, and possesses the properties, when hydrated, of a smooth, creamy, emulsion-like organoleptic character necessary to stimulate the mouthfeel associated with fat particles. Thus, the novel product obtained from the practice of the process according to the present invention has the characteristics necessary to be used as a protein-based fat substitute in food stuffs. In addition to the textural characteristics of these protein microparticles, aqueous dispersions of the protein microparticles are extremely white, making them ideal as potential coffee whiteners.

The following figures, examples and procedures are provided in order to provide a more complete and detailed understanding and illustration of the present invention. These figures, examples and procedures are presented for purposes of clarification and illustration, they are not presented nor intended in any manner to limit the scope of the present invention.

In the Figures.

Figure 1:
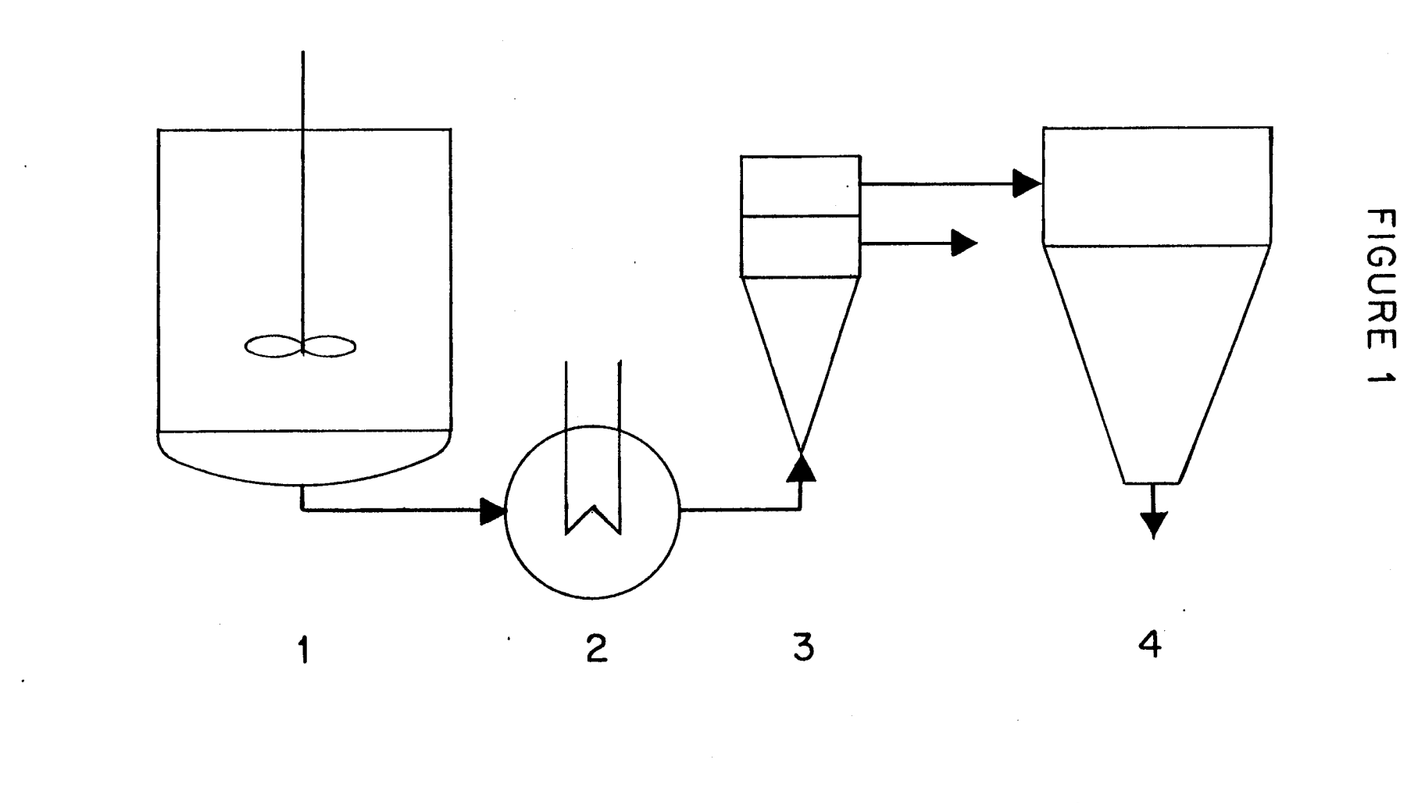
FIG. 1 is a schematic depiction of the process for producing egg protein according to the present invention.

As depicted in FIG. 1, the process according to the present invention for producing the egg protein according to the present invention involves a mixing and/or shearing station 1 in which egg white powder is mixed with gelatin to form small microbeads; a heating station 2 which allows the mixture to set the beads in the same manner that egg white is set when exposed to cooking; a centrifugal separation station 3; and a final drying station 4. A more detailed explanation of the individual processing steps are contained in the following example.

EXAMPLE I

Spray-dried egg white powder was obtained for Deb-El foods Corp. (Elizabeth, N. J.) or Henningsen Foods, Inc. (White Plains, N.Y.). Type A,275 Bloom gelatin, NaCl, NaN$_3$, and NaH$_2$PO$_4$·H$_2$O were obtained from Fisher Scientific (Pittsburgh, Pa.). Type B, 250 Bloom gelatin was obtained from Germantown Manufacturing Co. (Broomall, Pa.). Microscopy supplies were obtained from Electron Microscopy Sciences (Ft. Washington, Pa.).

Mixed gelatin-egg white solutions were prepared in 0.6M NaCl, 0.2M NaH$_2$PO$_4$·H$_2$O buffer at pH 6.0 following the procedure of Ziegler and Rizvi [see J. Food Sci., 54(2):430 (1989)]. Gels were formed from mixed protein solutions by heating to 80° C. for 1 hr, quenching in an ice/water slush and aging for 24 hrs. at 5° C.

One (1) mm cubes of gel were fixed in 3% glutaraldehyde in 0.15M Na cacodylate buffer (pH 7.1) for several days, then post-fixed in 1% OsO$_4$ in 0.15M Na cacodylate buffer (pH 7.1) for 1 hr. Gel pieces were then stained, en bloc, in 1% uranyl acetate in 0.1M Na acetate buffer for 1 hr, dehydrated in a gradient series of acetone and embedded in Spurr's low viscosity medium. Thick sections (1 µm) were cut using Sorvall ® Mt-2 ultramicrotome, stained in 1% toluidine blue in 1% Na borate and observed with a Leitz Ortholux optical microscope. Thin sections (60 nm) were cut using an LKB.

Microbeads of egg white protein were produced from solutions of 6.13% (w/w) egg white protein—6.43% (w/w) type B gelatin in 0.6M NaCl, 0.2M NaH$_2$PO$_4$·H$_2$O buffer by first mixing at 40° C. for 40 min., followed by quiescent heating at 80° C. for 1 hr. Solutions were then washed twice by repeated dilution with 60° C. distilled water and centrifugation. Following centrifugation, the egg white microparticles were redispersed in distilled water using a Branson Instruments Model S-75 sonifier. One (1) mL of a dilute suspension of microparticles was filtered through a 0.2 µm polycarbonate filter (Gelman Sciences, Inc., Ann Arbor, Mich.). Samples on filters were fixed overnight at 4° C. in 3% glutaraldehyde in 0.15M Na cacodylate buffer at pH 7.1, and post-fixed for 1 hr in 1% OsO$_4$ in 0.15M Na cacodylate buffer at pH 7.1. Dehydration was accomplished through a gradient series of ethanol, followed by critical point drying in a Polaron E3000 Critical Point Dryer using liquid CO$_2$ as the transitional fluid. Samples were mounted on aluminum stubs, sputter-coated with approximately 28 nm of gold, and viewed on an International Scientific Instruments Model 60 scanning electron microscope at an accelerating voltage of 30 kV.

Figure 2A:
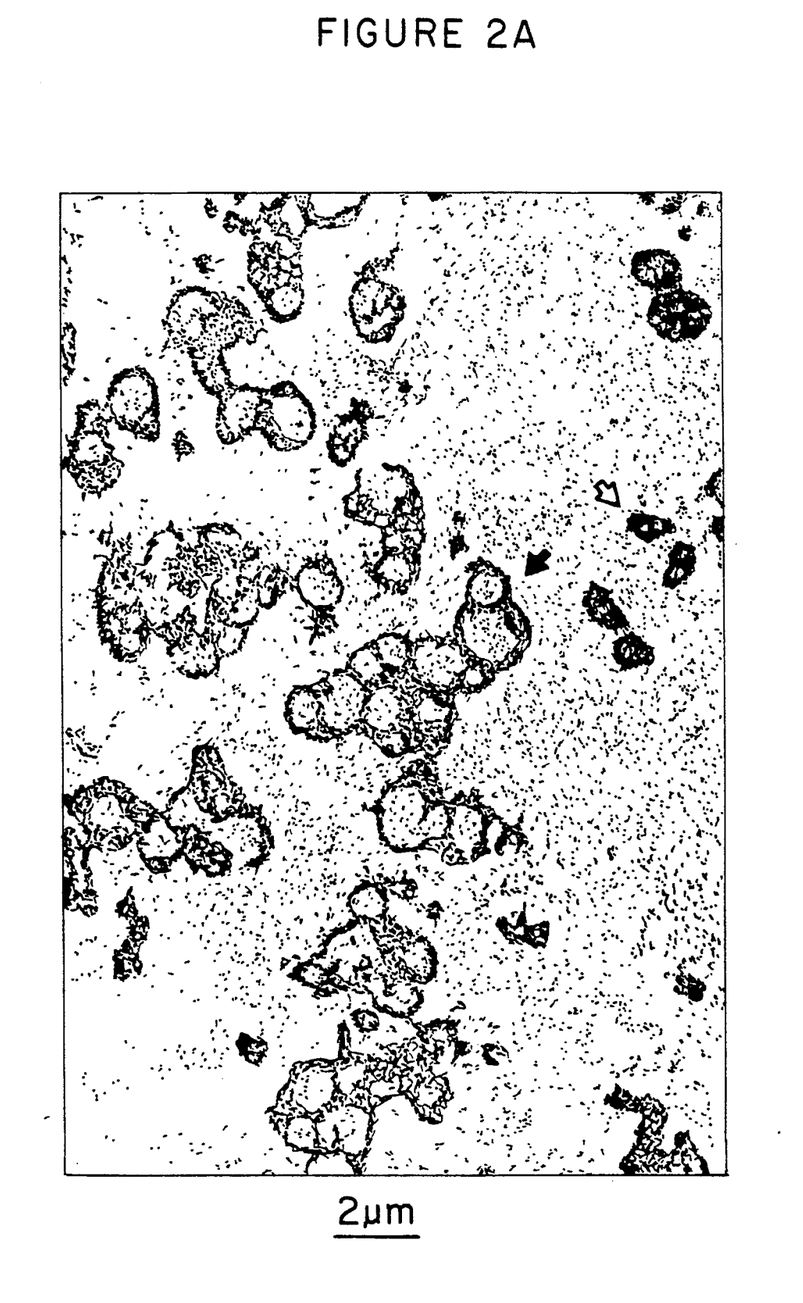
FIGS. 2A and 2B are a transmission electron micrographs of the egg white product manufactured according to the present invention.
Figure 2B:
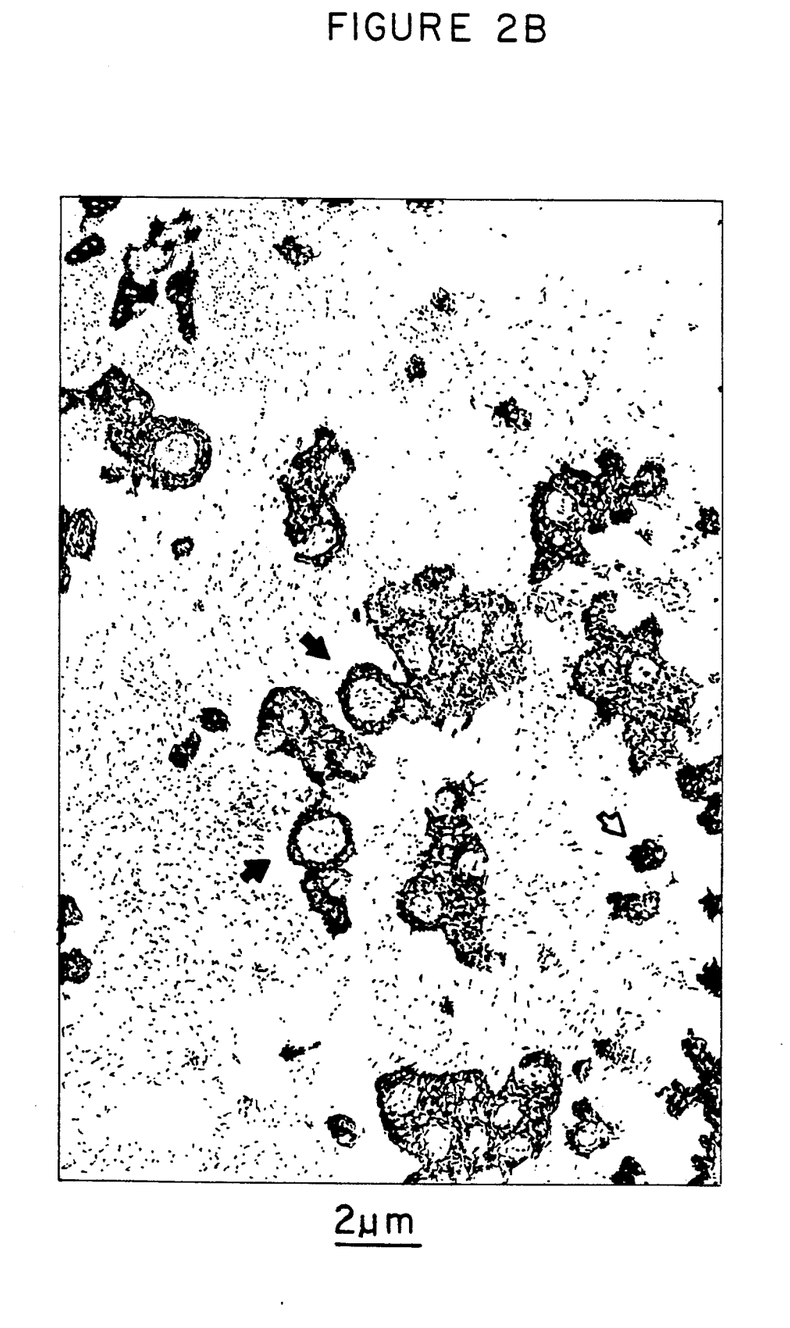

The transmission electron micrographs of egg white protein microparticles manufactured according to Example 1 are depicted in the FIG. 2. In this figure, the dark arrow indicates protein capsules as described below, while the open arrow indicates solid protein particles.

Utilizing the process according to the present invention, additional gels containing the nominal concentrations of gelatin and egg white of from about 1.41% to about 4.62% (w/w) gelatin, and from about 5.60% to about 6.05% (w/w) of egg white protein were manufactured.

Figure 3:
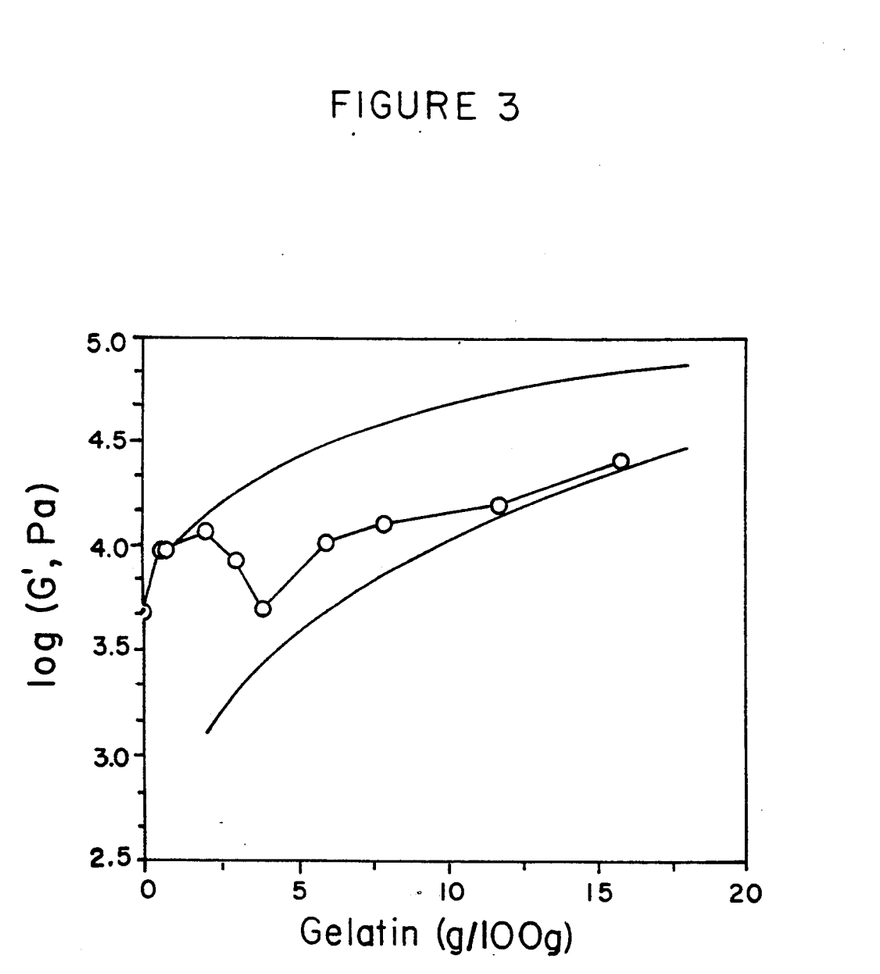
FIG. 3 is a comparison of experimentally determined values of the dynamic shear modulus for mixed gels containing egg white and gelatin.

FIG. 3 is a comparison of experimentally determined values of the dynamic shear modulus [see J. Food Sci., 54(2)430 (1989)] with the estimated bounds on the shear modulus (G') calculated using the Takayanagi models and values of the phase volume fraction, $\phi_{gelatine}$ and $\phi_{egg}$ obtained from optical image analysis contained in the following table:

| Gelatin (g/100 g) | Egg White (g/100 g) | n | 0 egg |
|---|---|---|---|
| 2.87 | 5.60 | 2 | 0.2180 ± 0.0149 |
| 4.61 | 5.60 | 3 | 0.2134 ± 0.0175 |
| 7.66 | 5.60 | 3 | 0.2046 ± 0.0240 |

The relative affinity parameter, p, is defined implicitly by the equation [see Macromolecules 16:1367 (1983)]:

$$alpha = px/(px+y),$$

where alpha is the fraction of solvent associated with the gelatin phase, x is the nominal concentration of gelatin (w/w) and y is the nominal concentration of egg white protein (w/w). From the data in the previous table, p was calculated to be 5. The boundaries on the composite shear modulus corresponding to a value of p=5 are plotted in FIG. 3. This is higher than the value of p of 2–3 determined empirically by Ziegler and Rizvi [see J. Food Sci., 54(2):430 (1989)]. A value of p<1 implies that the Y polymer (egg white) is more solvent attracting than the X polymer (gelatin), the opposite being true for p>1. Consequently, the boundaries calculated by the modified Takayangi models change most noticeably for changes in p close to 1. Above p=3 the boundaries are relatively insensitive to the value of p. After phase separation and solvent partitioning, the true or effective concentrations of gelatin and egg white protein in their respective phases (beginning with 4.61% gelatin and 5.60% egg white (w/w) were approximately 5.8 and 27.8%.

The transition from the upper boundary to the lower boundary on G' set out in FIG. 3, occurring between 2 and 4% added gelatin, was related to observable changes in the gel microstructure. Below 2% gelatin, mixed systems were macroscopically single phase, supported principally by the egg white network. Above 4% gelatin, gels were macroscopically two phase, and supported by a continuous gelatin phase containing dispersed particles of egg white protein. Between 2 and 4% gelatin, varying proportions of large, continuous networks of egg white protein and small, dispersed particles of egg white were observed.

Previous studies suggested that interpenetrating polymer networks (IPN's) were formed in mixed gelatin-egg white protein gels which were macroscopically single phase, but not direct confirmation was presented. For highly compatible polymers which form IPN's both networks are continuous throughout the entire sample. Even with some degree of incompatibility, where partial phase separation may occur, the two components appear to remain intimately mixed, the dimensions of the phase domains being on the order of hundreds of Angstroms and dependent on the degree of incompatibility. IPN's have been found to exhibit a characteristic cellular structure, where the first network makes up the cell walls and the second the cell contents. IPN's are possible even when the two networks are completely compatible, where thermodynamically only a single phase exists, if important differences such as the mechanism of gelation still remain which would allow for a gelation sequence to be established. Such was found to be the case for gelatin and egg white protein.

Electron micrographs of a mixed gelatin-egg white protein gel which was macroscopically single phase (no phase separation was observed upon extended centrifugation) were made and studied. Both the gelatin (appearing as a fine, evenly dispersed portion) and egg white protein (appearing as a dense, coarse portion) networks were visible. Even though the system was microscopically single phase, some limited incompatibility was apparent, as evidenced by the regions devoid of protein at the interface between the networks. This observation also provided credibility to the assumption that the two networks are exclusive, i.e., they gel by vastly different mechanisms. The fine, evenly dispersed gelatin network is characteristic of transparent gels. The coarse network with greater fluctuations in protein density, larger pores and thicker strands, is characteristic of opaque, heat-set gels such as egg white.

FIG. 2 (A and B) are transmission electron micrographs showing the structure of the egg white protein particles produced in two phase systems. Two types of particles were observed: small ($\leq 0.5$ μm diameter), spherical particles (light arrows), and larger (1-2 μm diameter) particles with a dense outer coat of protein and a less dense interior with regions devoid of protein (dark arrows). Voids seemed to be present only in particles which exceeded some critical size, roughly 0.5-1.0 μm. This interpretation is somewhat tentative, since the smaller solid particles may have been an artifact created by sectioning through the solid portion of a larger protein capsule. However, both scanning electron microscopy and particle size analyses confirmed the presence of particles with diameters below 0.5 μm, and very few particles of this diameter or less showed internal voids. Aggregation of particles distorted the shape somewhat and lead to the formation of "grape-like" clusters as seen at the dark arrow in FIG. 2 at A.

Figure 4:
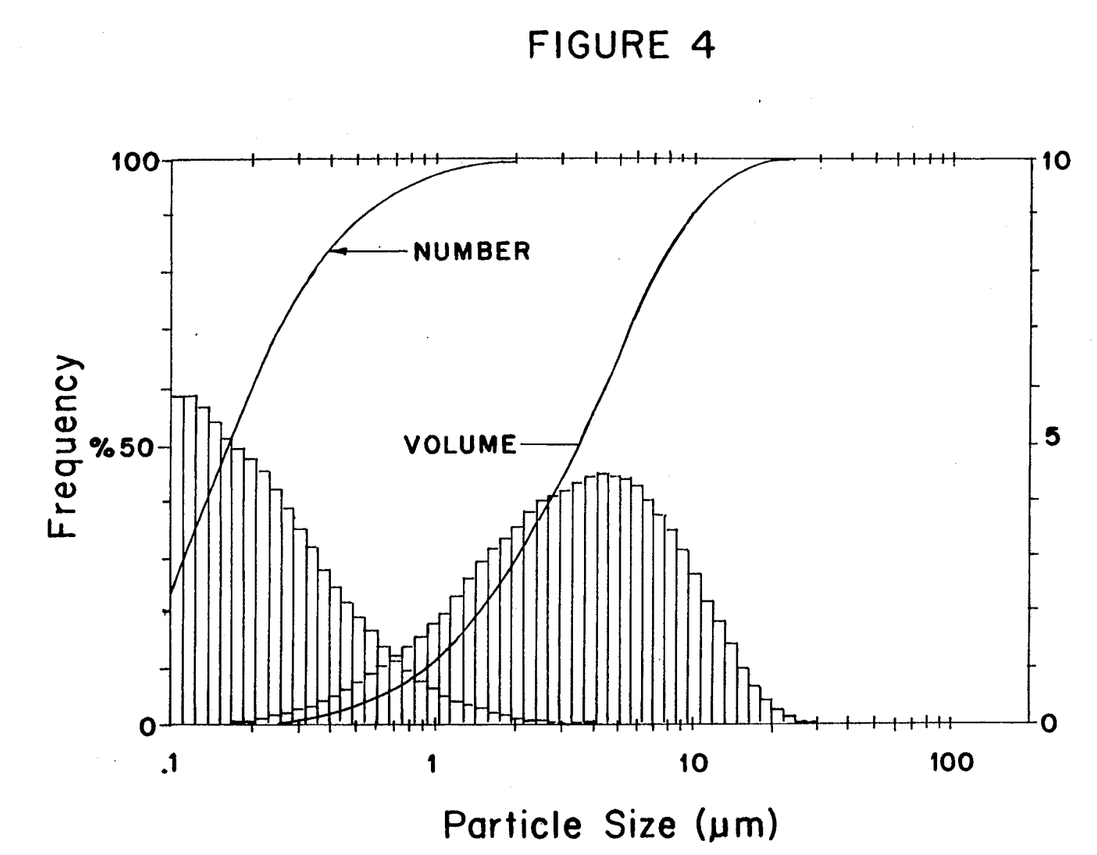
FIG. 4 depicts the particle size distribution of protein particles made in accordance with the present invention.

Under the appropriate conditions, aqueous phase partitioning of egg white and gelatin leads to the formation of a two phase system with a continuous phase of gelatin-water and a dispersed phase of egg white-water which resembles a typical oil-in-water emulsion. Under shear, the size of the egg white phase domain can be reduced and, on heating, microparticles of egg white formed, and particle size and the degree of agglomeration may also be controlled by varying the shear. Dispersion before, during or after heating produced differing effects. Particle size distribution of egg white microparticles prior to drying, and produced under low shear conditions, are shown in FIG. 4. Simple fragmentation of heat-set gel networks, while producing "microparticulated" protein, does not result in the uniform, spherical particles which may be necessary to simulate the mouthfeel of fat.

In addition to the use of type B gelatin in manufacturing the protein microparticles according to the present invention, type A gelatin was also tested as an obvious equivalent to the type B. Type B gelatin was found to be superior in several respect: Separation of gelatin from egg white particles, after heating, by repeated washing and centrifugation was easier using type B; particles produced by partitioning with type B appeared to have a smaller mean diameter over the volume distribution than those produced by partitioning with type A, D[4,3] equal to 3.85 vs 5.60 microns, respectively. Furthermore, the shape of the size distribution curve more closely approximated a normal distribution for type B than type A.

EXAMPLE II

Using type B gelatin, the process was scaled up to a total batch size of 10,000 grams (22 lbs) containing 600 g of dry egg white solids, 700 g of gelatin, and 8700 g of solvent. The material was processed in a 10 gal. milk can, agitated with a Lightnin' mixer and heat to 80° C. for 1 hour using a stream-jacketed bath. Microparticles were separated from the gelatin using centrifugation. Agglomerated particles were redispersed using a two-stage homogenizer at a total pressure of 2500 psi. Although D[4,3] was slightly higher than that produced at "benchtop", 5.32 microns, the size distribution was narrower. The number distribution showed less than 0.6% greater than 2.83 microns, and homogenization was equally as effective in redispersing the particles as ultrasonics.

A sample of a 5% aqueous dispersion of microparticles from example II, with 0.025% sodium azide as an antimicrobial agent, were examined to determine the suitability of spray drying the protein particles. Three 200 ml volumes of sample were processed at various inlet temperatures of 145° C. (typical of egg albumin drying), 175° C., and 215° C., to determine temperature limitations relative to the degradation of the microparticles. In each case the feed rate was 10 ml/ml through a conventional 5 mm orifice jet nozzle assembly, and the blower and spray compressor were operated at their maximum settings to reduce residence exposure to heat and ensure smallest possible droplet sizes.

At each temperature and in each instance, a fine granular dry white powder resulted. The consistency of each of the sample powders appeared generally similar with no major observable differences. The product was spray-dryable as compared with other products, such as that described in U.S. Pat. No. 4,734,287.

Four "low fat" desert foods were prepared to test the characteristic and organoleptic character of products using the microparticulated protein product made in accordance with example II. These were: (1) 4% by weight butterfat ice-milk (37.6% T.S.); (2) 4% by weight additional milk solids non-fat (38.5% T.S.); (3) 4% by weight of microparticulated egg white protein solids (36.9% T.S.); and (4) 4% by weight of additional nonmicroparticulated egg white solids (37.7% T.S.). These were manufactured according to the generalized process outlined in Example III, below:

EXAMPLE III

All dry ingredients [sugar, corn syrup solids (36 D.E.), non-fat dried milk, and stabilizer/emulsifier blend] was weighed and mixed. All liquid ingredients [cream (30-40% milkfat), and skim milk] were weighed and mixed. The liquid ingredient mixture was then preheated to 45° C. and the dry ingredients were added with continuous stirring. The temperature of the mixture was raised to 55°-60° C., the mixture was homogenized at 1200 to 2000 psi pressure, and pasteurized at 68° C. for 30 minutes. After pasteurization was complete, the mixture was cooled to 4° C. and allowed to age for 4 to 12 hours. After aging, the required amount of flavoring was added and the mixture frozen under continuous stirring in an ice cream freezer. After manufacturing the ice milk product, it was placed into small containers which were placed in a freezer at −40° F. for hardening and storage. Before judging, the ice milk product was tempered to 0° F.

In each instance for the "low-fat" desserts tested, the final batch size was 2500 grams. Freezing was done in a Simac, El Gelataio, benchtop ice cream freezer.

The final viscosity of the mix containing microparticles was about 3.5 times that of the control containing 4% butterfat. Informal sensory analysis of the products indicated that the frozen dessert made from mix 3 was creamier than the others. When a particle size analyses of the frozen dessert mixes was conducted, a significant amount of milkfat globules with a mean diameter of about 1 micron were apparent in mix 1, but, as expected, were nearly absent in mix 2. It was also apparent that the microparticles made in accordance with the present invention survived the mix making process intact. The particles did not agglomerate on pasteurization, or if they did, they became redispersed on homogenization. The data collected from example III support the premise that replacement of fat should be on a hydrated-volume basis.

Using the general description in Example III, a nonfat frozen dessert may be prepared from the microparticulated egg protein product manufactured according to the present invention utilizing the following formulation:

| | |
|---|---|
| microparticulated (dry) protein | 100.0 grams |
| milk solids (non fat) | 325.5 grams |
| Sugar | 275.0 grams |
| corn syrup solids | 175.0 grams |
| PGX stabilizer | 10.0 grams |
| microcrystalline cellulose | 15.0 grams |
| Vanilla flavoring | 1.9 grams |
| Water | 1,597.6 mls |

Any process used for microparticulation must produce aggregates of predictable size and size distribution and be reproducible if commercialization of the process is to be realized. Thus, the aggregation of microparticles in "grape-like" clusters which appeared in a limited number of tests of the process according to the present invention may be limited by homogenization, ultrasonics, or by employing a single agitation/heater to prevent coalescence of the dispersed egg white droplets prior to setting the gels.

An interesting feature of the egg white particles produced by the process according to the present invention is that some (those >0.5 μm diameter) resembled "capsules" having dense outer coats and a less dense interior containing void.

One limitation of the presently available protein-based fat replacers is that they do not function well as carriers of fat soluble flavors. However, since the egg white in gelatin-egg white system achieved with the present invention is more hydrophobic than the gelatin, a small amount of vegetable oil (from about 0.1 to 1.0% would be satisfactory) may be incorporated into the interior voids of the egg white capsules seen as a portion of the resulting microparticulated system according to the present invention by homogenization, with or without the addition of emulsifiers such as lecithin to accomplish this incorporation, to provide a fat substitute with significantly better, more fat-like, flavor carrying properties; the incorporation of such a small amount of lipid increases the caloric density only minimally while significantly enhancing the functionality of the replacement product.

Thus, while I have illustrated and described the preferred embodiment of my invention, it is to be understood that this invention is capable of variation and modification, and I therefore do not wish or intend to be limited to the precise terms set forth, but desire and intend to avail myself of such changes and modifications which may be made for adapting the present invention to various usages and conditions. Accordingly, such changes and modifications which may be made for adapting the present invention to various usages and conditions. Accordingly, such changes and modifications are properly intended to be within the full range of equivalents, and therefore within the purview of the following claims. The terms and expressions which have been employed in the foregoing specification are used therein as terms of description and not of limitation, and thus there is no intention, in the use of such terms and expressions, of excluding equivalents of the features shown and described, or portions thereof, it being recognized that the scope of the invention is defined and limited only by the claims which follow.

Having thus described my invention and the manner and process of making and using it in such full, clear, concise, and exact terms so as to enable any person skilled in the art to which it pertains, or to with which it is most nearly connected, to make and use the same, I claim:

1. A microparticle which comprises egg white proteins;
   the microparticle having a particle size of from about 0.5 to 3.0 μm; the microparticle having a dense outer coat consisting essentially of the egg white proteins; the microparticle having an interior region therein which is less dense than the outer coat of the microparticle; and the interior region of the microparticle containing therein a volume which is devoid of the egg white proteins.

2. A microparticle as recited in claim 1, wherein the volume in the interior of the microparticle which is devoid of the egg white proteins contains a lipid component.

3. A process for the preparation of microparticles which comprise egg white proteins, the microparticles having particle sizes of from about 0.5 to 3 μm, the microparticles having dense outer coats which consist essentially of the egg white proteins, the microparticles having interior regions therein which are less dense than the outer coats thereof, and the interior regions of the microparticles containing therein volumes which are devoid of the egg white proteins, the process comprising the steps of:

Step 1—mixing together an aqueous solution of a gelatin and an aqueous solution of egg white proteins under low shear conditions in a mixing chamber, such that microbeads comprising the egg white proteins are formed in the mixture of the aqueous solutions by aqueous phase partitioning;

Step 2—heating the mixture to a temperature sufficient to set the egg white proteins contained in the microbeads; and Step 3—separating the microbeads from the mixture, whereby the microparticles comprising the egg white proteins are obtained.

4. The process recited in claim 3, wherein the process further comprises the step of:

Step 4—drying the microparticles.

5. The process recited in claim 3, wherein the solution of the gelatin and the solution of the egg white proteins are mixed together in Step 1 at a temperature of about 40° C.

6. The process recited in claim 3, wherein the mixture is heated in Step 2 to a temperature of about 80° C.

7. The process recited in claim 4, wherein the process comprises the further step of:
Step 5—redispersing the dried microparticles.

8. The process recited in claim 7, wherein the dried particles are redispersed by homogenizing.

9. The recited in claim 7, wherein the dried particles are redispersed using ultrasonic energy.

10. The process recited in claim 3, wherein the microparticles, when hydrated, possess a substantially smooth and emulsion-like organoleptic character.

11. In a formulated edible food product for human consumption normally containing fats in a sufficient concentration to make an organoleptic contribution to said food product, the improvement comprising:
replacing at least a portion of said fats in the food product with a hydrated microparticle which comprises egg white proteins; the microparticle having a particle size of from about 0.5 to 3.0 μm; the microparticle having a dense outer coat consisting essentially of the egg white proteins; the microparticle having an interior region therein which is less dense than the outer coat of the microparticle; and the interior region of the microparticle containing therein a volume which is devoid of the egg white proteins.

12. The formulated food product recited in claim 11, wherein the volume in the interior of the microparticle which is devoid of the egg white proteins contains a lipid component.

* * * * *